UNITED STATES PATENT OFFICE.

ADOLPH SPIEGEL, OF HÖCHST-ON-THE-MAIN, GERMANY, ASSIGNOR TO FARB-WERKE, VORMALS MEISTER, LUCIUS & BRÜNING, OF SAME PLACE.

AZO COLORING-MATTER.

SPECIFICATION forming part of Letters Patent No. 302,790, dated July 29, 1884.

Application filed January 10, 1884. (Specimens.)

*To all whom it may concern:*

Be it known that I, ADOLPH SPIEGEL, doctor of philosophy, a citizen of the Empire of Germany, residing at Höchst-on-the-Main, in the Empire of Germany, have invented certain new and useful Improvements in the Production of Fast Azo Colors upon Textile Fabrics, of which the following is a specification.

My invention relates to the manufacture of a new coloring-matter soluble in water from an azo coloring-matter insoluble in water, but soluble in spirit, which coloring-matter is derived from ortho-amido-phenol.

In carrying out my invention I first prepare the azo coloring-matter "dichlorphenol-azo-beta-naphthol" of the formula—

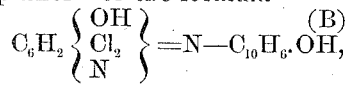

hereinafter using this name to designate it.

To prepare this compound I take the body known as "ortho-amido-dichlorphenol," which may have been prepared in various ways—as, for instance, by reducing the ortho-nitro-dichlorphenol of F. Fischer, (Zeitschrift für Chemie., 1868, p. 386.) The amido-dichlorphenol is diazotized in the well-known manner, and the diazo-dichlorphenol of Schmidt and Glutz, (Berichte der Deutchen, Chem., Ges., II, p. 52,)—a yellowish-brown body of the formula

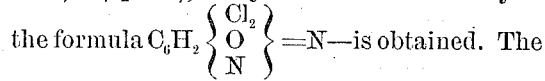

is obtained. The diazo-dichlorphenol is combined with a molecular quantity of beta-naphthol, according to the method well known to chemists, thereby producing the scarlet-colored salt of the scarlet-colored azo coloring-matter dichlorphenol-azo-beta-naphthol. This compound is distinguished by the following properties: It is insoluble in water, but soluble in various other mediums—such as spirits of wine—crystallizing in scarlet needles from the hot solution. When it is suspended in a solution of caustic soda, it forms a bluish-violet sodium salt.

In order to convert the azo coloring-matter just defined into the new coloring-matter soluble in water, I take, say, fourteen pounds in the shape of a paste or of a fine powder, and thereunto I add, say, one hundred-weight of spirits of wine along with, say, twenty-eight pounds of a concentrated solution of the bisulphite of an alkali. The mixture is now, in a closed vessel, or in one supplied with a reversed cooler, heated upon the water bath until the scarlet crystals of the compound have made room for the orange-colored crystals of the bisulphite of the aforesaid compound, which will be the case after two hours, care having been taken to stir it well. The alcohol is now distilled off, and the residual crystalline mass is allowed to cool. The crystals are separated from the suspending-liquid by filtration, and now represent the bisulphite compound ready for use in the form of powder or of a paste. The bisulphite compound thus obtained—the sulpho compound—is soluble in water with a yellow color. When an alkali is added to this yellow solution, or when it is boiled with a nitrite, being a bisulphite compound, is easily decomposed, and a bluish-violet salt above mentioned is precipitated.

Having thus described my invention, what I claim as new, and desire to secure by Letters Patent, is—

A new article of manufacture—an azo compound derived from dichlorphenol-beta-naphthol, being distinguished by its being soluble in water with a yellow color, and when an alkali is added to the solution, or when boiled with a nitrite, the bisulphite compound is decomposed and a bluish-violet salt is precipitated—substantially as set forth.

In testimony whereof I affix my signature in presence of two witnesses.

ADOLPH SPIEGEL.

Witnesses:
F. VOGELER,
J. GRUND.